United States Patent [19]

Biegger

[11] Patent Number: 5,563,796
[45] Date of Patent: Oct. 8, 1996

[54] CURVE CUTTING DEVICE FOR CUTTING A TEXTILE WEB AND A METHOD FOR CONTROLLING THE SAME

[76] Inventor: Roland Biegger, Donauwörther Strasse 35, 86663 Asbach-Bäumenheim, Germany

[21] Appl. No.: 318,802
[22] PCT Filed: Feb. 26, 1993
[86] PCT No.: PCT/DE93/00185
  § 371 Date: Jan. 11, 1995
  § 102(e) Date: Jan. 11, 1995
[87] PCT Pub. No.: WO93/21374
  PCT Pub. Date: Oct. 28, 1993

[30] Foreign Application Priority Data

Apr. 16, 1992 [DE] Germany ............... 42 12 867.6
Apr. 16, 1992 [DE] Germany ............... 42 12 868.4

[51] Int. Cl.$^6$ ............... G06F 19/00; D06H 7/16
[52] U.S. Cl. ............... 364/470.01; 364/474.09; 83/365
[58] Field of Search ............... 364/474.09, 469–473, 364/474.29, 474.37; 112/153; 83/365, 368–371, 63, 49, 74, 76.1, 76.4, 936, 937; 250/559.01, 559.02, 559.44–559.46; 356/429, 430; 219/121.67, 121.72, 121.83

[56] References Cited

U.S. PATENT DOCUMENTS 3,838,618 10/1974 Eissfeldt et al. ............... 83/365
4,071,899 1/1978 Holy ............... 83/365
5,461,999 10/1995 Marcangelo ............... 112/153

FOREIGN PATENT DOCUMENTS 2359288 6/1975 Germany.
4026250 3/1992 Germany.
9113625.3 3/1992 Germany.
1015464 12/1965 United Kingdom.

OTHER PUBLICATIONS

English translation of International Preliminary Examination Report for PCT/DE93/00185, May 17, 1994.
Roder, Die Steuerung von Brennschneidmaschinen, Mar., 1967, pp. 142–147, Elektrotechnische Zeitschrift, Ausgabe B., Bd. 19B, Nr. 6, 24.

Primary Examiner—Roy N. Envall, Jr.
Assistant Examiner—Steven R. Garland
Attorney, Agent, or Firm—Wolf, Greenfield & Sacks, P.C.

[57] ABSTRACT

An automatic method for controlling a curve cutting device used for cutting a textile web along a cutting line comprises different control strategies for critical and non-critical pattern segments. In non-critical pattern segments, the cutting head of the curve cutting device is controlled on the basis of the detected position of said cutting head relative to the light gap of the textile web. If, however, critical pattern segments are reached, the mode of operation will be changed over, whereupon the cutting head will be controlled on the basis of stored relative movement values from the moment the end of the preceding, non-critical pattern segment is reached.

15 Claims, 6 Drawing Sheets

CURVE CUTTING DEVICE FOR CUTTING A TEXTILE WEB AND A METHOD FOR CONTROLLING THE SAME

BACKGROUND OF THE INVENTION

1. Field of the Invention

The present invention refers to a method of controlling a curve cutting device for cutting a textile web as well as to a curve cutting device for cutting a textile web.

2. Description of the Related Art

Quite generally, the present invention deals with the cutting of textile webs having a curve-shaped border. In a special case of use, the present invention deals with the automated pinking or burning out of curtains.

Specific types of curtains have a curve-shaped lower border extending along a curtain pattern. This lower border is typically produced by manual work by pinking the curtains or by burning them out. This is done by an operator who draws a curtain by hand across a table, which is provided with a glow cutting wire extending at right angles to said table, in such a way that the glow cutting wire travels through a socalled light gap in the pattern of the curtain while said curtain is moving relative to said glow cutting wire, whereby crosspieces extending across the light gap will be cut through. This work is, of course, time-consuming and troublesome.

German Utility Model 89 07 823.3 discloses a curve cutting device of the type mentioned at the beginning, which is used for automated pinking or burning out of curtains and the cutting head of which is moved to and fro by means of a driving device for moving the cutting head at right angles to the direction of movement of the curtain in accordance with detection signals of an optoelectronic detection device. The detection device works with a broad light beam incident essentially at right angles to the plane of the curtain, said light beam being reflected towards a guide sensor, which is not described in detail, by a reflecting curve cutting mark applied to the curtain at the desired cutting location. According to said German Utility Model, a guide sensor is thus able to recognize the position of the cutting head relative to the curve cutting mark applied to the curtain and to automatically guide said cutting head. This publication does not disclose any information on the nature of the structural design of the guide sensor. However, said known curve cutting device is, if it is actually possible to realize it in practice, in any case limited to the processing of textile webs or types of curtains having a reflecting mark woven into the curtain or applied thereto; said reflecting mark has to be provided at the location of the desired cut. In the case of most types of curtains it is impossible to weave-in or to apply such curve cutting marks for reasons of production engineering or it is undesirable for reasons of costs.

In view of the fact that the measure of weaving into the textile web reflecting curve cutting marks of the type required in connection with the German Utility Model assessed hereinbefore is normally not applicable, the socalled pinking or burning out of curtains, i.e. the separation of a strip of woven fabric lying below the intended lower border of a curve-shaped curtain, is carried out by hand even nowadays.

Up to now, it has been regarded as being impossible to automatize this cutting of patterns.

The prior, not-prepublished German patent application P 41 36 069.9, which is owned by the applicant, already describes a curve cutting device comprising a cutting head, a driving device for moving said cutting head at right angles to the direction of movement of the textile web and an optoelectronic detection device for detecting the position of the cutting head relative to the light gap of the textile web. The optoelectronic detection device comprises three light barriers which permit autotracking of the cutting head with respect to the light gap of the textile web by combining the respective signals in a suitable manner. Although this curve cutting device permits fully automatic burning out of most curtains, there are a few types of curtains which cannot yet be processed in a fully automatic manner by this curve cutting device.

Taking this prior art as a basis, it is a major object of the present invention to further develop a method of controlling a curve cutting device in such a way that it is also possible to cut complicated patterns.

SUMMARY OF THE INVENTION

This object is achieved by a method of controlling a curve cutting device for cutting a textile web along a cutting line which determines a recurring pattern comprising at least two pattern segments each time, said curve cutting device comprising a cutting head carrying a cutting means, a driving device for moving said cutting head essentially at right angles to a direction of movement of the textile web, and an optoelectronic detection device for detecting the position of the cutting head relative to the textile web and for controlling the driving device on the basis of the relative position detected, wherein said method comprises the following method steps carried out prior to curve cutting:
— determining the uncritical pattern segments of the said pattern which are suitable for a control of the cutting head on the basis of the optoelectronically detected position of the cutting head relative to the light gap of the textile web;
— determining the critical pattern segments of the said pattern which are not suitable for a control of the cutting head on the basis of the optoelectronically detected position of the cutting head relative to the light gap of the textile web;
— storing relative movement values for the control of the cutting head which indicate the relative movement of the cutting head starting from the cutting head position at the end of the preceding, uncritical pattern segment for determining the shape of the respective critical pattern segment; and wherein said method further comprises the following method steps during curve cutting:
— controlling the driving device for the uncritical pattern segments on the basis of the detection of the relative position by the optoelectronic detection device; and
— controlling the driving device for the critical pattern segments on the basis of the stored relative movement values for a relative displacement of the cutting head starting from the position of the cutting head when the end of the preceding, uncritical pattern segment has been reached.

The present invention teaches that the pattern segments of a pattern recurring periodically along the line to be cut are first subdivided into two different types, viz. into non-critical pattern segments which are suitable for a control of the cutting head on the basis of the optoelectronically detected position of the cutting head relative to the light gap of the textiles and into critical pattern segments which are not suitable for a control of the cutting head on the basis of this optoelectronically detected position of the cutting head relative to the light gap of the textile web. For the pattern segments which have been classified as critical pattern segments by the operator, relative movement values are stored for the control of the cutting head. During the curve cutting process, which is first carried out for the non-critical pattern segments on the basis of the optoelectronic detection of the relative position, a change-over to a control on the basis of the stored movement values is effected when the end of the last non-critical pattern segment has been reached. It is essential to the present invention that, starting from the end of the last uncritical pattern segment which has been reached by optoelectronic position control of the cutting head, the above-mentioned control is carried out on the basis of relative movement values for the cutting head for the critical pattern segments.

The critical pattern segment thus begins at a location which may vary from one pattern period to the next due to the migration of the textile web or of the curtain transversely to the direction of movement so that the critical pattern segment will necessarily follow the last uncritical pattern segment at a suitable position.

Taking this prior art as a basis, it is another major object of the present invention to further develop a curve cutting device of the type mentioned at the beginning in such a way that it is also possible to cut complicated patterns.

This object is achieved by a curve cutting device for cutting a textile web, comprising — a cutting head carrying a cutting means, — a driving device for moving said cutting head essentially at right angles to a direction of movement of the textile web, and — an optoelectronic detection device for detecting the position of the cutting head relative to the textile web and for controlling the driving device in such a way that the desired curve will be cut, wherein — for detecting the position of the cutting head relative to a light gap of the textile web, the optoelectronic detection device comprises at least two light barriers which are arranged in such a way that the light rays defined thereby will intersect the plane of the textile web at at least two light spots, — one of said light barriers is arranged in such a way that the first light spot determined thereby is located at a perpendicular first distance from an axis extending in the direction of movement of the textile web through the cutting spot of the cutting means, said first perpendicular distance being larger than the second perpendicular distance between the second light spot, which is determined by the other light barrier, and said axis, — depending on the interruption condition of the other light barrier, the detection device moves the driving device in a first direction towards an area of woven fabric of the textile web or in a second direction opposite to said first direction, and — if the first light barrier is not interrupted, the detection device will deactivate the control of the driving device at least in the first direction towards said area of woven fabric, depending on the interruption condition of the other light barrier, for a predetermined period and/or for a predetermined path of movement of the textile web in the direction of movement thereof.

The curve cutting device according to the present invention works without any necessity of applying a reflecting mark to the textile web or of weaving such a mark into the textile web.

The curve cutting device according to the present invention detects the position of the cutting head relative to a light gap in the woven pattern of the textile web or of the curtain by means of two light barriers which are arranged in such a way that the light rays thereof intersect the plane of the textile web at two light spots located at different perpendicular distances from an axis defined in the direction of movement of the textile web through the cutting spot of the cutting means. On the basis of the interrupted or non-interrupted condition of these two light barriers, the cutting head is guided along an edge of the area of woven fabric of the textile web bordering on the light gap, in such a way that in a "normal" control condition the light barrier which is farther away from the cutting means will constantly lie in said area of woven fabric, whereas the light barrier which is less far away from the cutting means is guided along the edge of the area of woven fabric of the textile web at the light gap. This guiding is carried out in such a way that, in a preferred embodiment, the cutting head will be moved farther away from the area of woven fabric when this last-mentioned light barrier is interrupted, whereas, in the uninterrupted condition of this light barrier, the cutting head will be moved towards said area of woven fabric. If, however, the first-mentioned light barrier, which is constantly interrupted in the "normal" control condition, should be uninterrupted due to a recess or indentation of the area of woven fabric in the direction of the light gap, this "abnormal" condition of the woven fabric will be detected by the closed, first-mentioned light barrier and, in response to this detection, at least the movement of the cutting head towards the area of woven fabric will be deactivated depending on the interruption condition of the second light barrier. This deactivation can take place for a predetermined period of time or dead time or, if desired, depending on the transport speed of the textile web for a predetermined distance covered by said textile web.

BRIEF DESCRIPTION OF THE DRAWINGS

In the following, preferred embodiments of the curve cutting device according to the present invention will be explained in detail making reference to the drawings enclosed, in which.

DETAILED DESCRIPTION OF THE INVENTION

Figure 1:
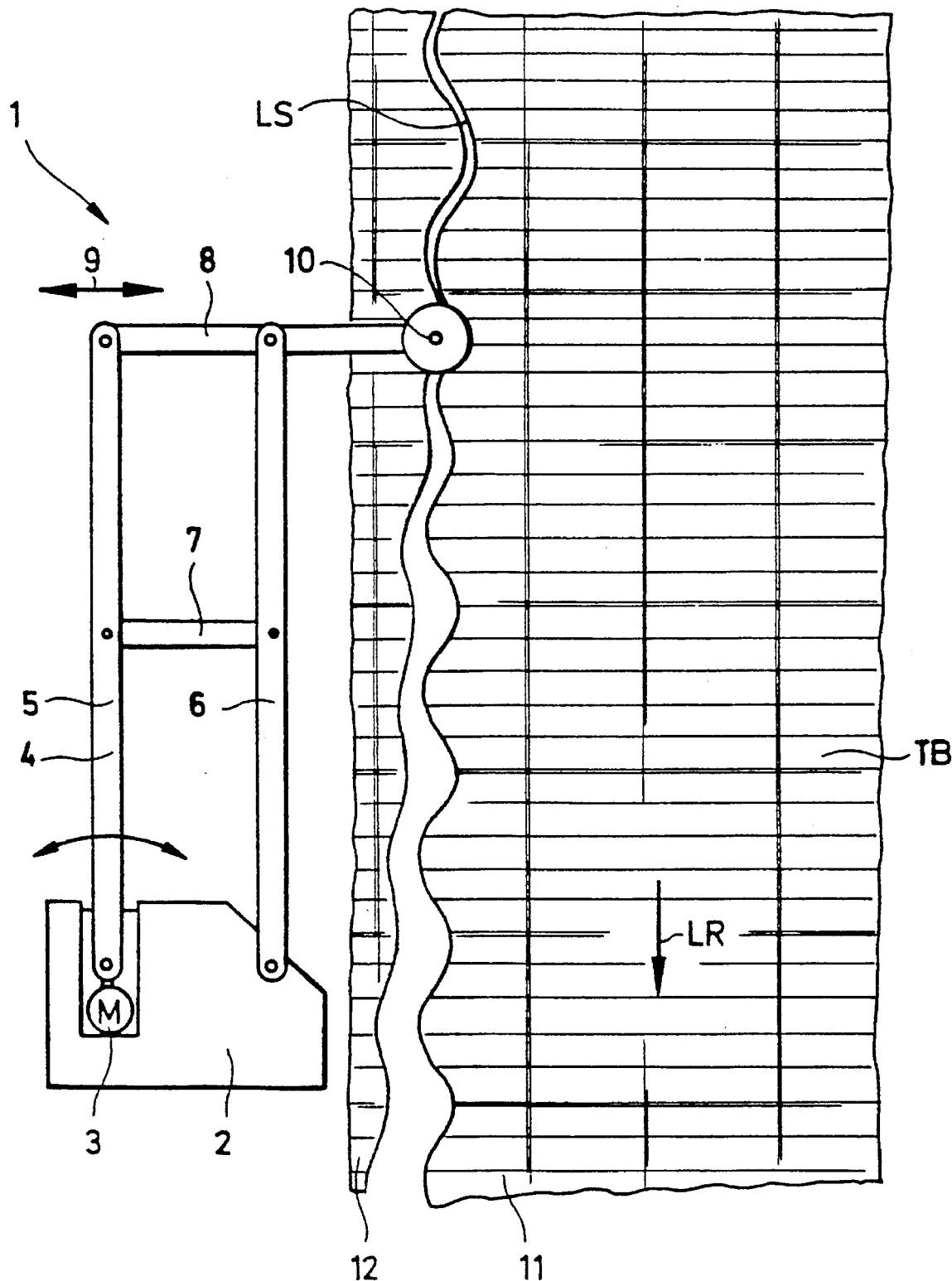
FIG. 1 shows a top view of a curve cutting device according to the present invention.

As can be seen in FIG. 1, the curve cutting device, which is shown in a top view in said FIG. 1 and which is designated generally by reference numeral 1, comprises a driving device 2 with an electric stepping motor 3 used for pivotably moving a parallelogram guide mechanism 4. The parallelogram guide mechanism comprises two parallel levers 5, 6, one lever 5 being articulated on the stepping motor 3 and the other lever 6 being pivotably supported on a housing of said driving device 2. A stiffening arm 7 extends between the levers 5, 6, said stiffening arm 7 having, in turn, supported its ends such that they are rotatable relative to the levers 5, 6.

The end of the parallelogram guide mechanism 4 facing away from the stepping motor 3 has attached thereto a guide arm 8, which is adapted to be moved to and fro in the direction of the arrow 9 in accordance with the rotary drive movement of the stepping motor 3.

The free end of the guide arm 8 carries a cutting head 10 whose structural design will be explained in detail hereinbelow making reference to FIGS. 2 to 6.

The curve cutting device 1 serves to cut a textile web TB, which will normally be a curtain web, along a socalled light gap; in the course of this cutting operation, the textile web will be divided into the final product 11 shown on the right hand side of FIG. 1 and a waste strip 12.

In order to supplement the above, it is stated that the textile web TB is automatically drawn across a table (not shown) in the direction of movement LR by means of a transport device (not shown).

Making reference to FIG. 2, an embodiment of the cutting head 10 will be explained in detail in the following. The cutting head 10 comprises an upper cutting head block 13 and a lower cutting head block 14. The two cutting head blocks 13, 14 are interconnected by a fastening element 15, said fastening element 15 being cranked twice and extending in a manner which will be explained in detail hereinbelow in such a way that it extends in the plane of the textile web up to a point close to a cutting spot of the cutting means relative to the textile web and serves as a splitting wedge for splitting the waste strip 12 of the textile web off from the final product 11.

The fastening element 15 is arranged on the cutting head blocks 13, 14 in sleeve-shaped guide means 16, 17, and it is adapted to be secured in position relative to said guide means 16, 17 by means of headless screws 18, 19 at an adjustable distance of the cutting head blocks 13, 14 from one another.

Figure 2:
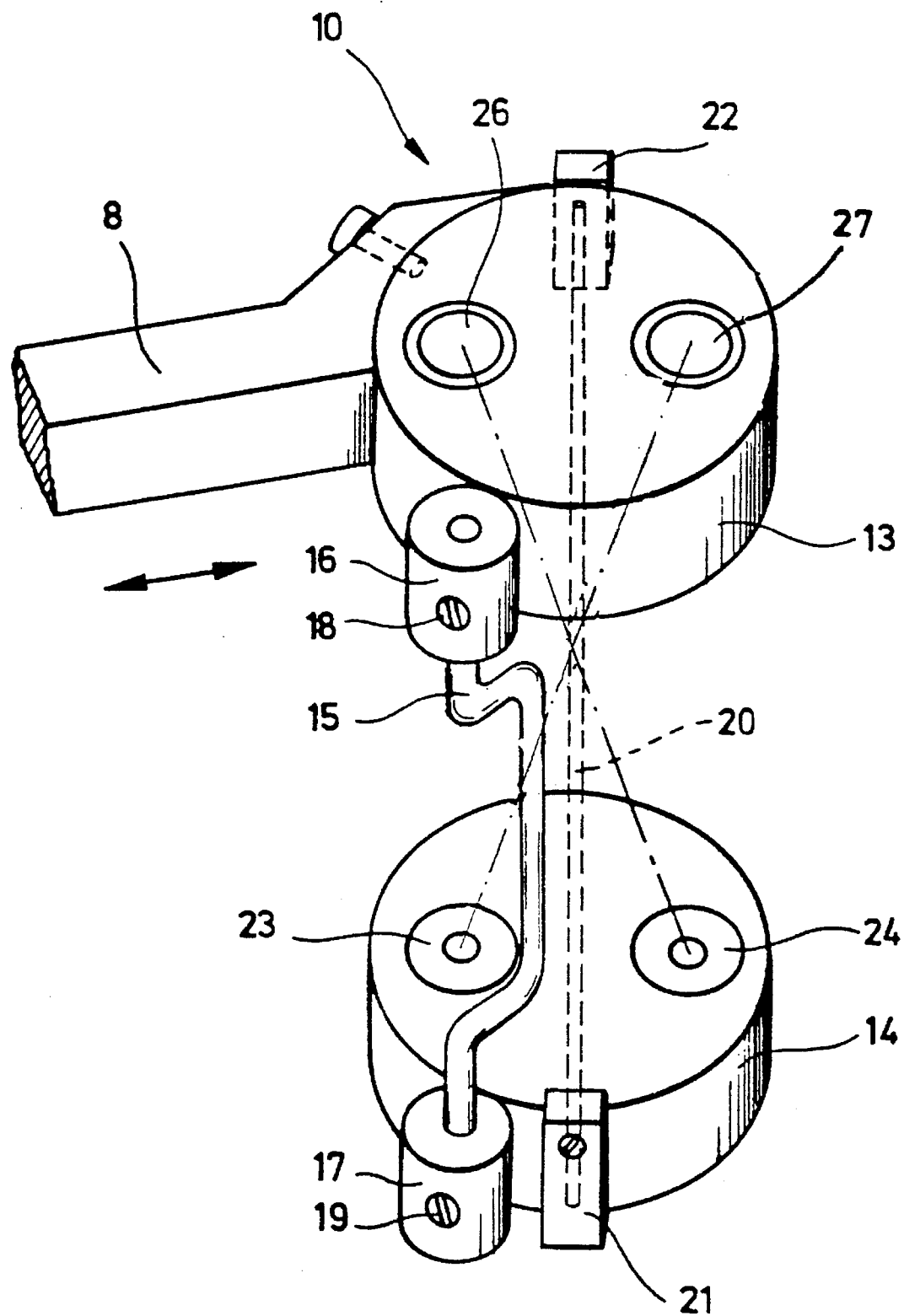
FIG. 2 shows a perspective view of an embodiment of the cutting head of the curve cutting device shown in FIG. 1.

In the embodiment of the cutting head shown in FIG. 2, the cutting means consists of a glow wire 20, which is secured in position and held in a tight condition by means of two glow wire holders 21, 22 at an oblique angle to the vertical, said glow wire holders 21, 22 being arranged on the cutting head blocks 13, 14 in diametrically opposed relationship. The glow wire holders 21, 22 are constructed as insulators. The glow wire 20 is a resistance glow wire which has applied thereto a suitable cutting current.

Even at this early stage of the description, reference is made to the fact that also any other cutting means may be used for the purpose of the present invention. The cutting head 10 can, for example, be provided with a sufficiently powerful laser beam source by means of which the textile web is thermally divided at the location of the light gap.

As is additionally shown in rough outlines in FIG. 2, the lower cutting head block 14 of the embodiment shown in said FIG. 2 comprises two light-receiving elements 23, 24, which can, for example, be constructed as phototransistors. The upper cutting head block 13 of this embodiment comprises two light-emitting elements 26, 27, which can, for example, consist of LEDs.

In the embodiment shown in FIG. 2, the light-receiving elements 23, 24 in one of the two cutting head blocks 13, 14 define together with the light-emitting elements 26, 27 in the other one of said two cutting head blocks two light barriers 24, 26; 23, 27, whose detection light rays are shown by dot-and-dash lines in FIG. 2.

Figure 3:
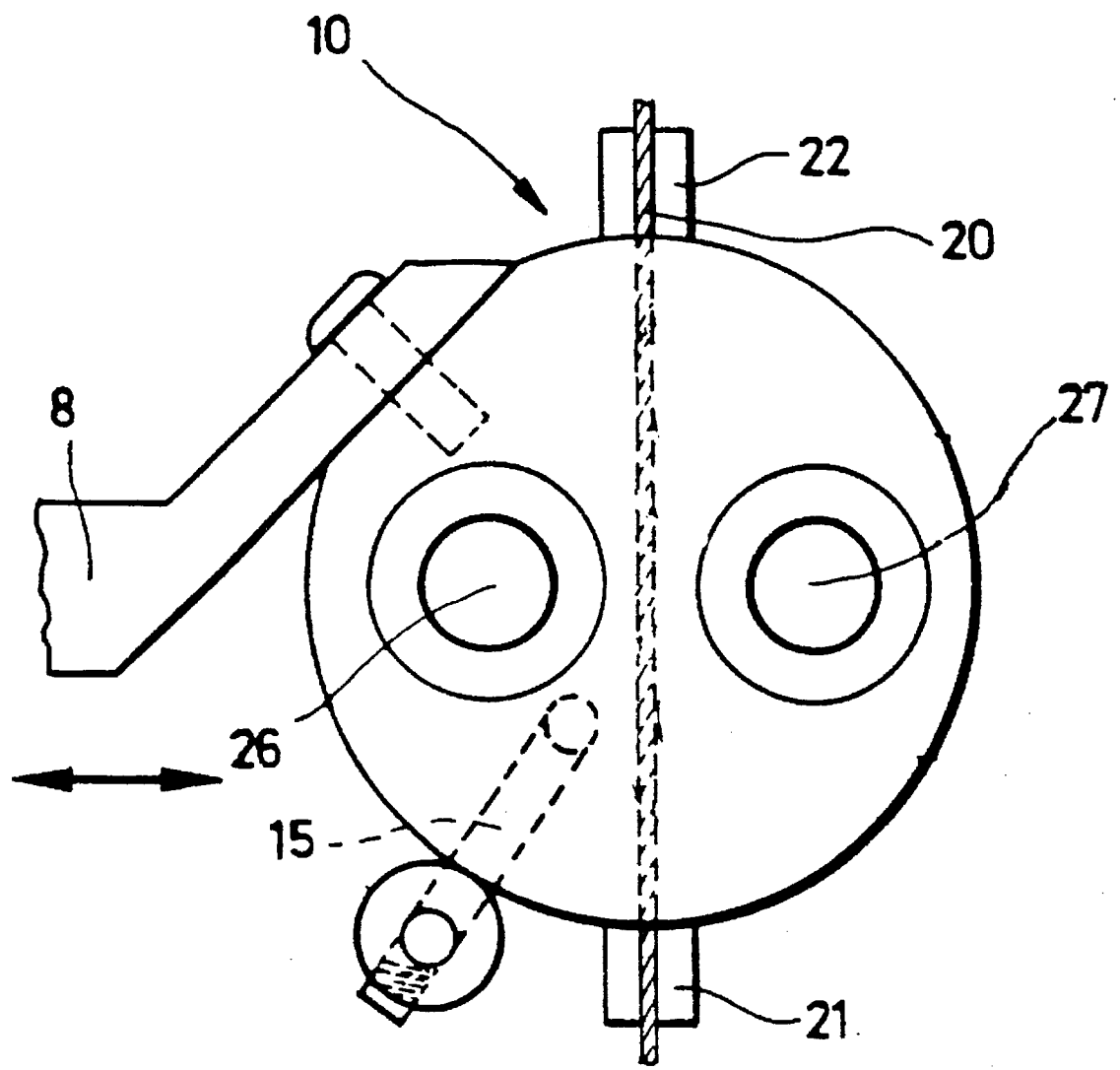
FIG. 3 shows a top view of the cutting head according to FIG. 2.

FIG. 3 shows a top view of the cutting head 10 shown in FIG. 2; said top view clearly shows the position of the glow wire 20, of the light-emitting elements 26, 27 and of the fastening element 15.

As is schematically shown in FIG. 2 and as will be explained still more clearly with reference to FIG. 5 in the description following hereinbelow, the detection light rays of the light barriers are arranged at an angle relative to the vertical on the plane of the textile web TB in a mutually inclined manner in such a way that the mutual distance between the light spots at which the light rays intersect the plane of the textile web TB is smaller than the mutual distance between the neighbouring light-emitting elements 26, 27, or the mutual distance between the neighbouring light-receiving elements 23, 24. In spite of the given geometry of the light-receiving elements and light-emitting elements, it is thus possible to choose the mutual distance between the light spots, which is determined by the light rays of the light barriers in the plane of the textile web, indefinitely small.

Figure 5:
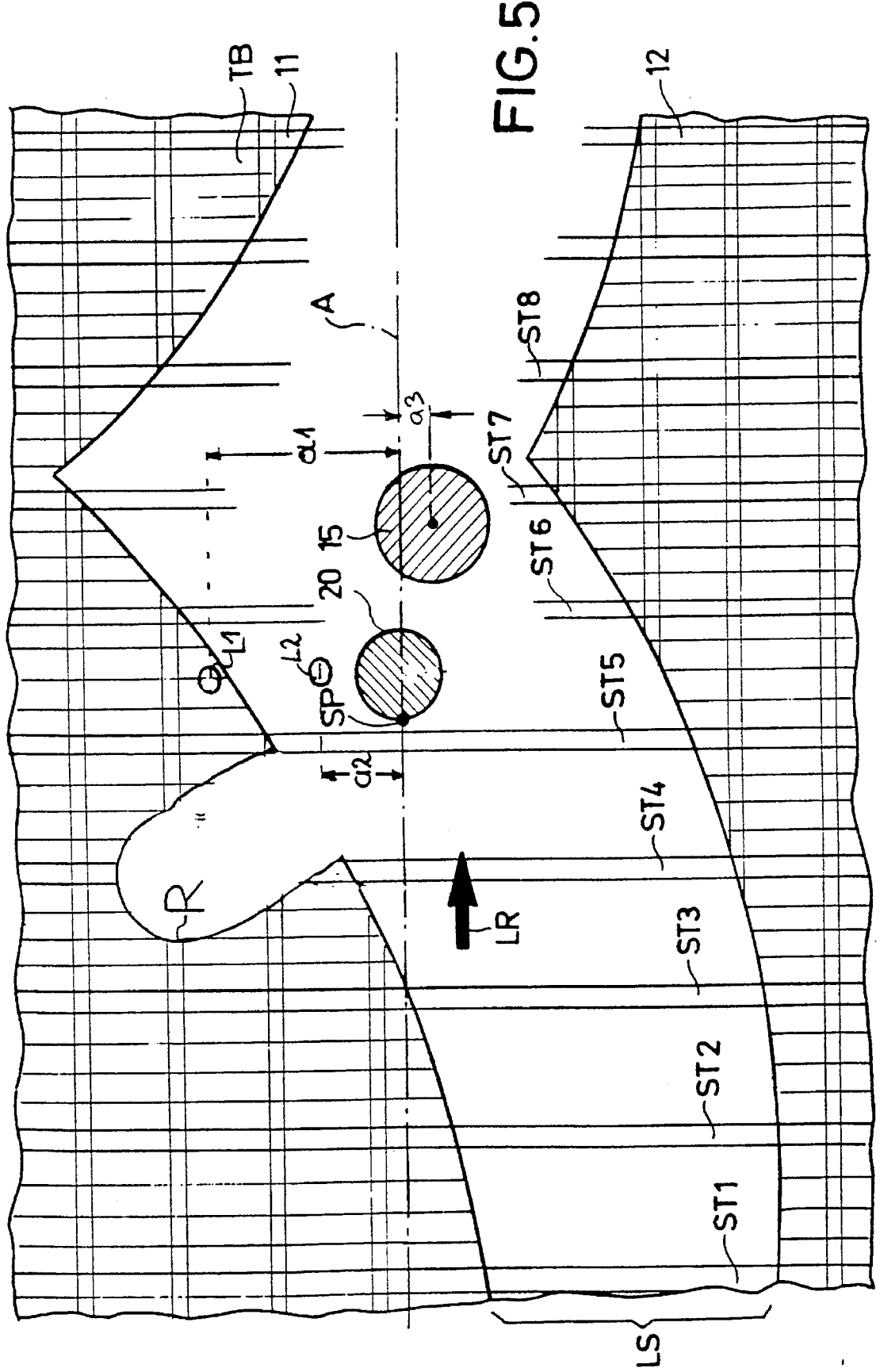
FIG. 5 shows a sectional view of the cutting head in the plane of the textile web.

FIG. 5 shows in the plane of the textile web TB to be processed, the light spots L1 and L2 formed by the two light rays when they intersect this plane. In accordance with the present invention, the light barriers defined by the light-emitting elements and the light-receiving elements are arranged such that, when two light spots L1, L2 exist, both light spots L1, L2 lie on one side of the cutting spot SP of the cutting means 20 on the textile web TB in relation to the direction of movement LR of said textile web TB. In other words, in the graphic representation according to FIG. 5, in which an axis A extends in the direction of movement LR through the cutting spot SP, both light spots L1, L2 lie above said axis A.

It is of essential importance that the first light spot L1 is positioned above the axis A and is located at a distance a1 from said axis A which is larger than the distance a2 between the other light spot L2 and said axis A. As will be evident from the control described hereinbelow, the first light spot L1 will, in this arrangement, normally lie in the area of the woven fabric 11 of the textile web TB, whereas the second light spot L2 will be guided along the edge of said area of woven fabric 11 of the textile web TB. To be exact, the driving device 2 is controlled in such a way that, in the non-interrupted condition of the second light barrier 23, 27, which forms the second light spot L2, the cutting head 10 is moved in a first direction (in FIG. 5 to the top) towards the area of woven fabric 11 of the textile web TB until this second light barrier 23, 27 will be interrupted. In this condition, the direction of movement of the cutting head 10 will be reversed, and this reversed direction of movement (in FIG. 5 to the bottom) will be maintained until the second light barrier 23, 27, which forms the second light spot L2, will again assume the non-interrupted condition.

Especially in the case of curtains, textile webs have the property that the light gap LS does not define in an ideal manner the edge of the area of woven fabric 11 to be cut. It happens quite frequently that irregularities occur in the woven fabric, said irregularities having typically the shape of a recess R in the area of the woven fabric 11; said recess R extends normally from the light gap LS at an angle of approx. 45° thereto and it extends into the area of woven fabric. In this case, a control on the basis of the second light barrier L2 alone would have the effect that the cutting head would migrate in the direction of the recess R (in FIG. 5 to the top) in an undesirable manner. This would result in destruction of the textile web to be cut. Hence, the present invention provides the feature that the control of the driving device is deactivated by means of the first light barrier at least in the first direction (direction towards the area of woven fabric) as soon as the first light barrier is not interrupted. In the most simple embodiment, this deactivation can take place for a predetermined dead time which can be defined e.g. by means of a socalled RC element. It is also possible to choose the duration of deactivation of the control of the driving device for moving the cutting head in the first direction such that it depends on the distance covered by the textile web, i.e. on the speed at which said textile web moves.

Deviating from the embodiment shown, a plurality of first light barriers can be provided instead of said first light barrier, said plurality of first light barriers being then preferably arranged such that they are staggered in the direction of movement LR for deactivating, by way of example, the control of the driving device for the cutting head 10 already at a point at which said cutting head has not yet fully reached the location of the recess R. Furthermore, it is not absolutely necessary to provide only one single second light barrier L2 which effects control of the cutting head along the edge of the area of woven fabric 11 in response to the interruption condition of said light barrier L2. If two second light barriers, which are arranged one on top of the other at a short (in FIG. 5) distance from each other, are used instead of the one light barrier L2 shown, said two light barriers being, however, both located at a distance from the axis A which is shorter than the distance between said axis A and the first light spot L1 defined by the first light barrier 24, 26, it will be possible to realize a hysteresis control. When two second light barriers of this type are provided, this can be done e.g. by carrying out control in the first direction (towards the area of woven fabric 11) only if both light barriers L2 are uninterrupted, whereas an oppositely directed drive control will only be effected if both light barriers L2 are simultaneously interrupted by the area of woven fabric 11.

The fastening element 15 passes through the plane of the textile web in such a way that, when seen in the direction of movement of the textile web TB, it is located behind the cutting spot SP and is displaced by a third distance a3 relative to the axis A in the direction of the waste strip 12.

As can be seen in FIG. 5, the glow wire 20 is guided within the light gap LS, whereby the crosspieces ST1, ST2, ST3, ST4, ST5, ST6, ST7, ST8, ... extending across the gap will be cut in accordance with the advance movement of the textile web TB.

Figure 4:
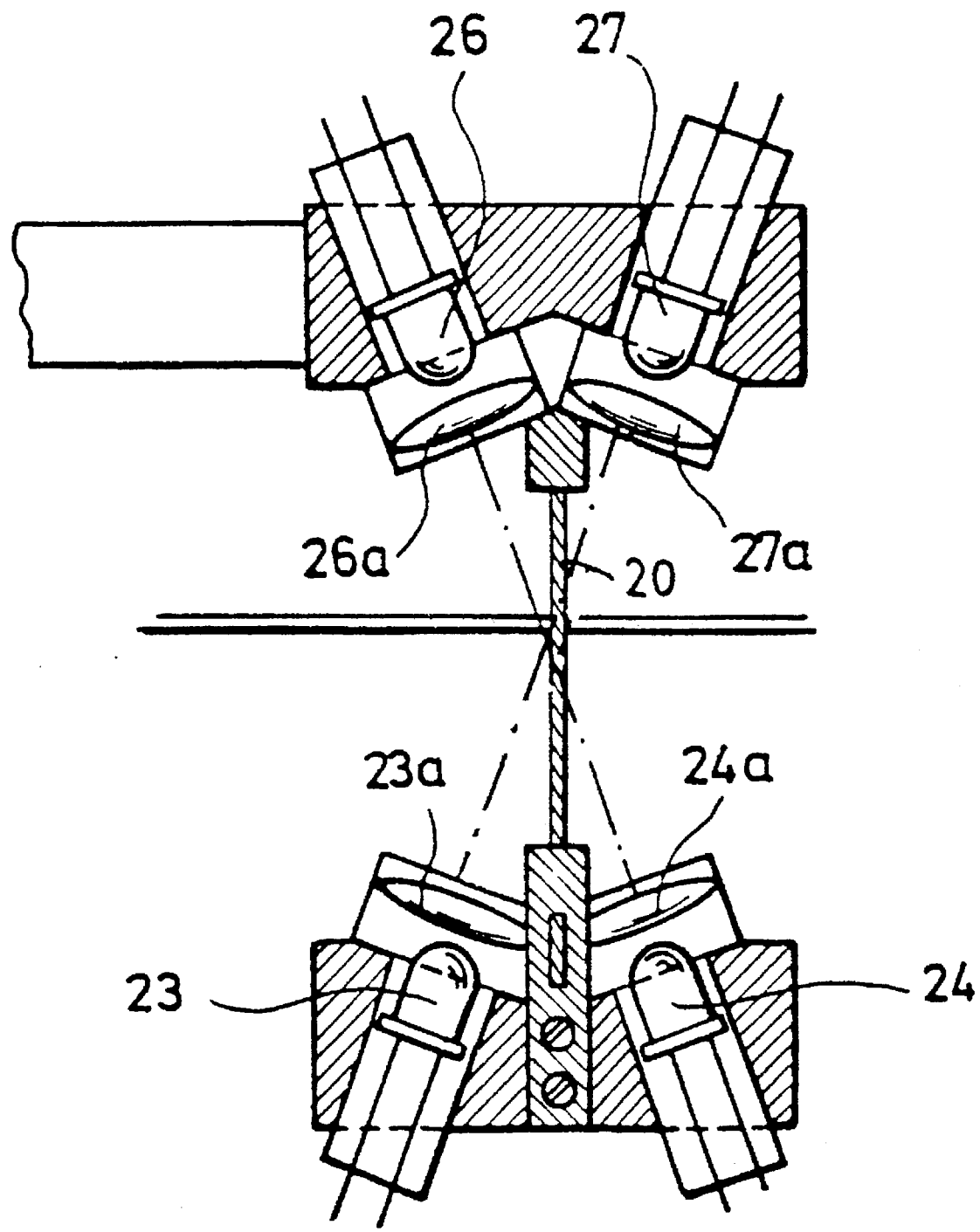
FIG. 4 shows a sectional view of an embodiment of the cutting head.

FIG. 4 shows a vertical sectional view of the embodiment of the cutting head in the transverse direction thereof. Reference numerals corresponding to those used in FIG. 2 refer to identical or similar parts so that a renewed explanation of these parts can be dispensed with.

As can be seen in FIG. 4, the light-emitting and light-receiving elements 23, 24; 26, 27 have associated therewith suitable optical systems 23a, 24a; 26a, 27a, which serve to improve focussing so that, with a given output power of the light-emitting elements 26, 27 and a given sensitivity of the light-receiving elements 23, 24, the vertical distance and, consequently, the length of the light barriers in the vertical direction can be increased. The optoelectronic elements, which are, in principle, delicate, can thus be positioned at a sufficiently large distance from the cutting means, which may e.g. be a glow wire 20 or a laser beam, for preventing them from being heated or from getting dirty.

Preferably, the light-emitting elements 26, 27 as well as the light-receiving elements 23, 24 are clock-pulse controlled, whereby the influence of extraneous light, caused especially by the glow wire 20, can be minimized.

In the embodiment shown, the light-emitting element and the light-receiving element of each light barrier are arranged on opposite sides of the plane, which is defined by the textile web, while the cutting device is in operation. When a reflecting or specular surface is arranged directly below the textile web, the light-emitting element as well as the light-receiving element of each light barrier can be positioned above the plane of the textile web.

Figure 6:
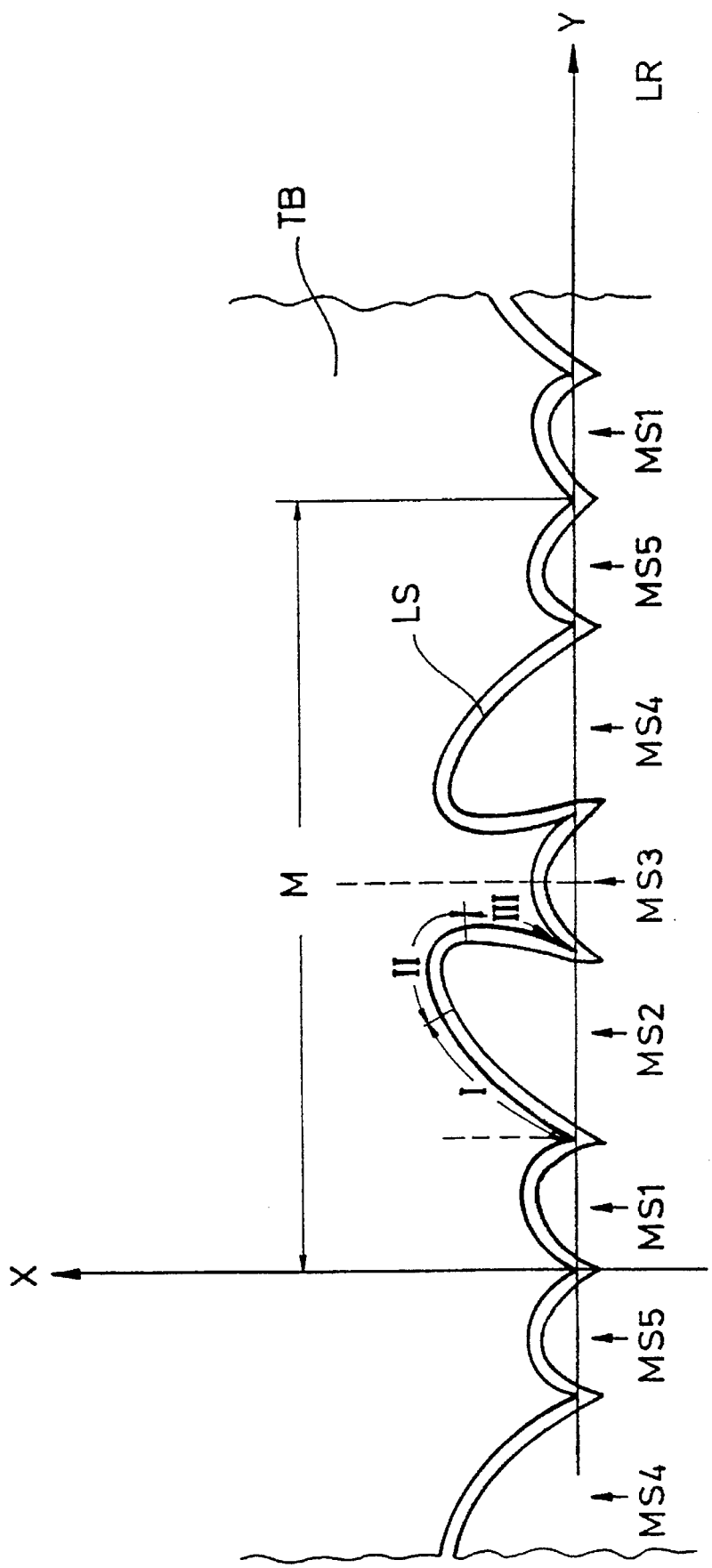
FIG. 6 shows a representation in the form of a sketch for illustrating critical and uncritical pattern segments.

The method according to the present invention used for controlling the curve cutting device, which may for example have the structure described in FIGS. 1 to 5, will be explained in detail hereinbelow with reference to FIG. 6. The present invention takes as a basis the finding that the cutting line to be produced by a curve cutting device during cutting of a textile web corresponds to periodically recurring patterns comprising each at least two pattern segments. According to the present invention, one of these patters is first analyzed by the operator so as to distinguish between critical and non-critical pattern segments. As is clearly shown in FIG. 6, the cutting line to be produced defines within the light gap LS periodically recurring patterns which are here designated by the reference sign M. Such a pattern comprises a plurality of pattern segments MS1, ..., MS5. The pattern segments MS1, MS3, MS5 which are adapted to be used for controlling the cutting head on the basis of the optoelectronically detected position of said cutting head relative to the light gap LS of the textile web TB will be referred to as non-critical pattern segments hereinbelow, whereas the pattern segments which will be referred to as critical pattern segments are pattern segments MS2, MS4 which cannot be cut by optoelectronically detecting the position of the cutting head relative to the light gap, when the textile web continues its forward motion in the direction of movement LR without any changes. This is the case with the pattern segments MS2, MS4 shown in FIG. 6 because these pattern segments partly show negative gradients and can therefore only be cut if, in the area of the flanks having a negative angle, the movement of the textile web TB is stopped and reversed in direction.

In accordance with the present invention, relative movement values for a control of the cutting head 10 starting from the end of the preceding non-critical pattern segment MS1, MS3 are stored for each of these critical pattern segments. In the preferred embodiment, these relative movement values are stored, with respect to a plurality of points for each pattern segment, in the form of numbers of pulses for the pulses used for controlling the stepping motor of the driving device 2. In the preferred embodiment, these stored values have associated therewith control signals for the driving speed of the drive means moving the textile web in the direction of movement LR. For example, the second pattern segment MS2 is stored in area I in the form of a plurality of pulse values or numbers of pulses for the stepping motor of the cutting head control in the x direction, these values having associated therewith a control signal for the driving motor for the textile web in the y direction, said control signal corresponding to forward transport of the textile web at high speed. In the subsequent area II, the speed of forward transport in the y direction is adjusted to a small value by means of a suitable control signal. In area III, the textile web will be moved backwards in its direction of movement (y direction) at a low speed until the end of the stored pattern MS2 has been reached. At this point, the system will change over to control by means of the optoelectronic detection system used for detecting the position of the cutting head 10 relative to the light gap LS in the textile web TB so that the forward movement can be continued in the y direction at full speed.

An orientation of the system within the pattern M is preferably achieved due to the fact that the system is provided with a pattern segment counter detecting the respective points of reversal (tips pointing downwards in FIG. 6) of the direction of movement. This detection of the points of reversal can easily be carried out by an evaluation of the control signal of the driving device 2. The counter (not shown) counting the points of reversal will thus be incremented at each point of reversal so that these points of reversal will be particularly suitable for effecting a change over between critical pattern segments and non-critical pattern segments, i.e. for changing over between the cutting head control mode which is optoelectronically guided and the cutting head control mode which is guided by stored values.

It is specially emphasized that the method according to the present invention is not impaired by lateral migration or lateral displacement of the textile web TB (in the x direction). In practical operation, the position of the whole textile web TB will sway within certain limits in the x direction during transport of the textile web in the y direction. In view of this fact, it would be impossible to cut the textile web on the basis of stored data for the whole pattern M alone. Hence, the present invention provides the features that, due to the optoelectronic control which can be effected e.g. by means of the light barrier technique described at the beginning, the cutting head will follow the path of the light gap LS when non-critical pattern segments are cut, and that the only segments which will be cut on the basis of stored relative values for the cutting head movement are those which cannot be guided with the aid of optoelectronic position control. Since, consequently, the stored pattern segments inevitably start from the end of the optoelectronically scanned non-critical patterns, the system will automatically follow a slight displacement of the position of the textile web TB in the x direction which will occur in the course of many pattern periods M. Hence, the system according to the present invention permits automatic cutting of pattern structures, even if these pattern structures are of a complicated nature, by means of a simple control device for the realization of which it is not even necessary to provide a microcomputer.

It is specially pointed out that, for storing and controlling the relative values for the numbers of pulses of the critical pattern segments, it will suffice to use simple storage circuits whose stored values can be read out successively in response to a clock signal. As will be obvious to the person skilled in the art, this clock signal can be synchronized with the movement of the textile web in the direction of movement LR although this is not absolutely necessary.

In the embodiment described hereinbefore, an arrangement of two light barriers has been used as an optoelectronic detection device. It is, of course, also possible to use a different number of light barriers, and also other optoelectronic detection means may serve to detect the position of the light gap, said optoelectronic detection means including a scanner among other means. Also a scanner and an image processing device following said scanner can easily be used for detecting the position of a light gap and for utilizing it thus for the aims to be achieved by the present invention.

In said embodiment, the light-emitting element and the light-receiving element of each light barrier are arranged on opposite sides of the plane, which is defined by the textile web, while the cutting device is in operation. When a reflecting or specular surface is arranged directly below the textile web, the light-emitting element as well as the light-receiving element of each light barrier can be positioned above the plane of the textile web.

What is claimed is:

1. A method of controlling a curve cutting device for cutting a textile web along a cutting line corresponding to a recurring pattern comprising at least two pattern segments, the curve cutting device comprising a cutting head carrying a cutting means, a driving device for moving the cutting head essentially at right angles to a direction of movement of the textile web, and an optoelectronic detection device for detecting a position of the cutting head relative to the textile web and for controlling the driving device on the basis of the relative position detected, wherein the method comprises the following method steps carried out prior to curve cutting:
— determining uncritical pattern segments of the pattern which are suitable for controlling the cutting head on the basis of an optoelectronically detected position of the cutting head relative to a light gap of the textile web;
— determining critical pattern segments of the pattern which are not suitable for controlling the cutting head on the basis of the detected position of the cutting head relative to the light gap of the textile web; and
— storing relative movement values for controlling the cutting head when cutting a critical pattern segment, the relative movement values corresponding to a shape of the critical pattern segment and indicating relative movement of the cutting head starting from a cutting head position at an end of an uncritical pattern segment preceding the critical pattern segment; and wherein the method further comprises the following method steps carried out during curve cutting:
— controlling the driving device, when cutting each of the uncritical pattern segments, on the basis of the detected position of the cutting head by the optoelectronic detection device; and
— controlling the driving device, when cutting each of the critical pattern segments, on the basis of the relative movement values for a relative displacement of the cutting head starting from the cutting head position when the end of each preceding uncritical pattern segment has been reached.

2. The method according to claim 1, wherein
— the relative movement values are numbers of pulses used for controlling a stepping motor of the driving device for the cutting head.

3. The method according to claim 1, comprising the following method steps:
— detecting predetermined movement reversal processes of the cutting head after each pattern segment,
— counting a number of pattern segments on the basis of a number of detected movement reversal processes; and
— changing between controlling the driving device for the uncritical pattern segments and controlling the driving device for the critical pattern segments in response to the number of detected movement reversal processes counted.

4. The method according to claim 1, wherein the step of controlling the driving device for the critical pattern segments includes a step of reducing the driving speed of the textile web in the direction of movement from a specific point within one of the critical pattern segments.

5. The method according to claim 1, wherein the step of controlling the driving device for the critical pattern segments includes a step of reversing the driving direction of the textile web in the direction of movement from a specific point within one of the critical pattern segments.

6. The method according to claim 1, wherein the step of controlling the driving device for the critical pattern segments includes a step of bringing the textile web to a standstill at a specific point within one of the critical pattern segments.

7. The method according to one of the claims 1 to 6, further comprising a step of storing a plurality of relative movement values corresponding to the critical pattern segments.

8. A curve cutting device for cutting a textile web, the curve cutting device comprising:
— a cutting head carrying a cutting means,
— a driving device for moving the cutting head essentially at right angles to a direction of movement of the textile web, and
— an optoelectronic detection device for detecting a position of the cutting head relative to the textile web and for controlling the driving device in such a way that a desired curve will be cut, wherein
— for detecting the position of the cutting head relative to a light gap of the textile web, the optoelectronic detection device comprises a first light barrier and a second light barrier which are arranged in such a way that light rays defined thereby will intersect a plane of the textile web respectively at a first light spot and a second light spot,
— the first light barrier being arranged in such a way that the first light spot is located at a first perpendicular distance from an axis extending in the direction of movement of the textile web through a cutting spot of the cutting means, the first perpendicular distance being larger than a second perpendicular distance between the second light spot and the axis,
— the detection device being adapted to move the driving device in an appropriate one of a first direction towards an area of woven fabric of the textile web and a second direction opposite to said first direction in response to an interruption condition of the second light barrier, and
— the detection device being adapted to deactivate movement of the driving device at least in the first direction towards the area of woven fabric, in response to the interruption condition of the second light barrier when the first light barrier is not interrupted, for at least one of a predetermined period and a predetermined path of movement of the textile web in the direction of movement thereof.

9. The curve cutting device according to claim 8, wherein
— the detection device controls the driving device in such a way that, when the second light barrier is uninterrupted, the cutting head is moved in the first direction towards the area of woven fabric of the textile web until the second light spot leaves the light gap and the second light barrier is interrupted, and that, when the second light barrier is interrupted, the cutting head is moved in the second direction away from the area of woven fabric of the textile web until the second light barrier is no longer interrupted.

10. The curve cutting device according to claim 8, wherein
— the cutting head comprises an upper cutting head block and a lower cutting head block,
— the upper cutting head block being connected to the driving device by means of a guide arm, and
— the lower cutting head block being fastened to the upper cutting head block by means of a fastening element acting as a splitting wedge for the textile web.

11. The curve cutting device according to claim 10, wherein
when seen in the direction of movement of the textile web, the splitting wedge is positioned behind the cutting spot at a third distance from the axis towards a strip of textile waste that is cut off the textile web.

12. The curve cutting device according to claim 10, wherein the cutting means includes a glow wire stretched between the upper and lower cutting head blocks.

13. The curve cutting device according to claim 10, wherein each of the first and second light barriers is defined by a light-emitting element in one of the upper and lower cutting head blocks and a light-receiving element in the other of the upper and lower cutting head blocks.

14. The curve cutting device according to claim 8, wherein the cutting means includes one of a laser beam and a laser light source.

15. The curve cutting device according to claim 8, wherein the first and second light barriers are arranged to angle the light rays relative to a vertical on the plane of the textile web in a mutually inclined manner, the light spots having a mutual distance therebetween that is smaller than a mutual distance between one of adjacent light-emitting elements and adjacent light-receiving elements.

* * * * *